United States Patent [19]

Herzl et al.

[11] Patent Number: 5,835,714
[45] Date of Patent: Nov. 10, 1998

[54] METHOD AND APPARATUS FOR RESERVATION OF DATA BUSES BETWEEN MULTIPLE STORAGE CONTROL ELEMENTS

[75] Inventors: Robert Dov Herzl, Lake Katrine; David Andrew Schroter, Wappingers Falls, both of N.Y.

[73] Assignee: International Business Machines Corporation, Armonk, N.Y.

[21] Appl. No.: 459,875

[22] Filed: Jun. 2, 1995

Related U.S. Application Data

[63] Continuation of Ser. No. 755,237, Sep. 5, 1991.

[51] Int. Cl.⁶ .................................................. G06F 13/37
[52] U.S. Cl. ............................... 395/200.38; 395/200.39; 395/200.69; 395/200.81; 395/800.31; 395/185.09; 395/290; 395/308; 395/311
[58] Field of Search .................................. 395/800, 299, 395/287, 840, 728, 200.38, 200.39, 200.69, 200.81, 800.31, 185.09, 290, 308, 311

[56] References Cited

U.S. PATENT DOCUMENTS

| | | | |
|---|---|---|---|
| 3,735,360 | 5/1973 | Anderson et al. | 395/256 |
| 3,771,137 | 11/1973 | Barner et al. | 395/447 |
| 4,142,234 | 2/1979 | Bean et al. | 395/471 |
| 4,263,649 | 4/1981 | Lapp, Jr. | 345/287 |
| 4,394,731 | 7/1983 | Flusche et al. | 395/472 |
| 4,467,418 | 8/1984 | Quinquis | 395/299 |
| 4,494,193 | 1/1985 | Brahm et al. | 395/200.06 |
| 4,500,985 | 2/1985 | Chang | 370/14 |
| 4,503,497 | 3/1985 | Krygowski et al. | 711/124 |
| 4,571,673 | 2/1986 | Horst et al. | 395/375 |
| 4,636,943 | 1/1987 | Horst et al. | 395/375 |
| 4,652,874 | 3/1987 | Loyer | 340/825.05 |
| 4,654,788 | 3/1987 | Boudreau et al. | 395/287 |
| 4,665,477 | 5/1987 | Desmazieres | 364/184 |
| 4,727,479 | 2/1988 | Kirrmann | 395/299 |
| 4,837,682 | 6/1989 | Culler | 395/294 |
| 4,837,736 | 6/1989 | Donaldson et al. | 395/184.01 |
| 4,933,846 | 6/1990 | Humphrey et al. | 395/287 |
| 4,943,959 | 7/1990 | Arnold | 370/85.5 |
| 4,979,100 | 12/1990 | Makris et al. | 395/297 |
| 5,003,467 | 3/1991 | Donaldson et al. | 395/293 |
| 5,131,085 | 7/1992 | Eikill et al. | 395/290 |
| 5,481,727 | 1/1996 | Asano et al. | 711/150 |

*Primary Examiner*—John E. Harrity
*Assistant Examiner*—John Follansbee
*Attorney, Agent, or Firm*—Whitham, Curtis & Whitham; Lynn L. Augspurger

[57] ABSTRACT

A data bus reservation system controls data transfer between storage control elements (SCEs) in a multi-processor system. Each SCE is assigned a default bidirectional (BIDI) data bus for transfer of data. If a request for data transfer is made and the default data bus is already reserved, then the requester must wait for the data bus to become available and a token passed to the requester. When the token is passed to the requester, it has priority to reserve an available data bus. The token is passed to a different processor with each machine cycle. Additionally, there is error checking logic which checks a confirmation sent to the other SCE when the BIDI bus has been reserved.

3 Claims, 4 Drawing Sheets

METHOD AND APPARATUS FOR RESERVATION OF DATA BUSES BETWEEN MULTIPLE STORAGE CONTROL ELEMENTS

This is a continuation of application Ser. No. 07/755,237 filed Sept. 5, 1991.

BACKGROUND OF THE INVENTION

1. Field of the Invention

The present invention generally relates to multi-processor (MP) data processing systems where each processor has to accommodate cross interrogate (XI) requests from other processors and, more particularly, to an efficient technique for resolving priority of requests for reservation of data buses where the storage control elements (SCEs) of requesters are separated from each other by delays of greater than one machine cycle. More specifically, the invention provides an efficient method for priority resolution where two requesters are contending to reserve one of two bidirectional data buses. The basic technique of the invention can be generalized to include a plurality of requesters attempting to reserve a plurality of data buses.

2. Description of the Prior Art

High performance, multi-processor (MP) computer systems are being developed to increase throughput by performing in parallel those operations which can run concurrently on separate processors. Such high performance, MP computer systems are characterized by multiple central processors (CPs) operating independently and in parallel, but occasionally communicating with one another or with a main storage (MS) when data needs to be exchanged. The CPs and the MS have input/output (I/O) ports which must be connected to exchange data.

In the type of MP system known as the tightly coupled multi-processor system in which each of the CPs have their own caches, there exist coherence problems at various levels of the system. More specifically, inconsistencies can occur between adjacent levels of a memory hierarchy. The multiple caches could, for example, possess different versions of the same data because one of the CPs has modified its copy. It is therefore necessary for each processor's cache to know what has happened to lines that may be in several caches at the same time. In a MP system where there are many CPs sharing the same main storage, each CP is required to obtain the most recently updated version of data according to architecture specifications when access is issued. This requirement necessitates constant monitoring of data consistency among caches.

A number of solutions have been proposed to the cache coherence problem. Early solutions are described by C. K. Tang in "Cache System Design in the Tightly Coupled Multiprocessor System", *Proceedings of the AFIPS* (1976), and L. M. Censier and P. Feautrier in "A New Solution to Coherence Problems in Multicache Systems", *IEEE Transactions on Computers*, December 1978, pp. 1112 to 1118. Censier et al. describe a scheme allowing shared writable data to exist in multiple caches which uses a centralized global access authorization table. However, as the authors acknowledge in their Conclusion section, they were not aware of similar approaches as described by Tang two years earlier. While Tang proposed using copy directories of caches to maintain status, Censier et al. proposed to tag each memory block with similar status bits.

These early approaches revolve around how to do bookkeeping in order to achieve cross-interrogates (XI) when needed. The idea was to record at the global directory (copies or memory tags) information about which processor caches owns a copy of a line, and which one of the caches has modified its line. The basic operation is to have the global table record (with a MODIFIED bit) status when a processor stores into a line. Since store-in caches are used, the processor cache controller knows, from its cache directory, which lines are modified or private. A store into a non-modified line at a processor will necessitate synchronization with the storage controller and obtaining the MODIFIED status first. Therefore, a storage block cannot be exclusive, or modifiable, for a processor unless the processor has actually issued a store into it, even when the cache has the only copy of the line in the system.

The EX status in a more general sense, as described in U.S. Pat. No. 4,394,731 to Flusche et al., can allow a processor to store into the cache without talking to the storage control element (SCE), even when the line was never stored into the cache. This is a subtle difference but is rather important from a conceptual point of view, since it allows, for example, in an IBM/3081 system, acquiring EX status of a line at a processor when a subsequent store is "likely" to come.

There are various types of caches in prior art MP systems. One type of cache is the store through (ST) cache as described in U.S. Pat. No. 4,142,234 to Bean et al. for the IBM System/370 Model 3033 MP. ST cache design does not interfere with the CP storing data directly to the main storage (or second level cache) in order to always update changes of data to main storage. Upon the update of a store through to main storage, appropriate cross-interrogate (XI) actions may take place to invalidate possible remote copies of the stored cache line. The storage control element (SCE) maintains proper store stacks to queue the main storage (MS) store requests and standard communications between buffer control element (BCE) and SCE will avoid store stack overflow conditions. When the SCE store stack becomes full, the associated BCE will hold its MS stores until the condition is cleared.

Another type of cache design is the store-in cache (SIC) as described, for example, in U.S. Pat. No. 3,735,360 to Anderson et al. and No. 4,771,137 to Warner et al. A SIC cache directory is described in detail in the aforementioned U.S. Pat. No. 4,394,731 to Flusche et al. in which each line in a store-in cache has its multi-processor shareability controlled by an exclusive/read only (EX/RO) flag bit. The main difference between ST and SIC caches is that, all stores in SIC are directed to the cache itself (which may cause a cache miss if the stored line is not in the SIC cache). It is also proposed in U.S. Pat. No. 4,503,497 that data transfers upon a miss fetch can take place through a cache-to-cache transfer (CTC) bus if a copy is in the remote cache. A SCE is used that contains copies of the directories in each cache. This permits cross-interrogate (XI) decisions to be resolved at the SCE. Usually, cache line modifications are updated to main storage only when the lines are replaced from the cache.

The connections between SCEs in multi-processor (MP) systems are implemented via cables providing bidirectional data buses. For an MP system having, for example, two SCEs, there may be two bidirectional (BIDI) data buses between the two SCEs. In very large MP systems where the physical connection between SCEs is long, physical packaging restrictions prevent SCEs from communicating with one another in the same machine cycle, whereas the cables between SCEs in prior machines have been short enough that requests and data issued by one SCE reached the other SCE in the same machine cycle. Another contributing factor is the increased processor clock rates of newer MP systems. These higher clock rates mean that even cables that were short enough to allow requests to be communicated in one machine cycle in prior machines now produce a significant delay measured in machine cycles. Communication via the BIDI buses is accomplished by reserving one or the other of the buses by a requester SCE. However, when the connection between the processors results in a delay that is longer than one machine cycle, the delay caused by the cable length causes a problem in communication between the SCEs. Specifically, there is a problem in resolving the priority of requests for the BIDI buses. For such large machines where communications cannot be accomplished in one machine cycle, what is needed is a technique for efficiently resolving priority of requests for reservation of data buses.

SUMMARY OF THE INVENTION

It is therefore an object of the present invention to provide an efficient reservation system of bidirectional data buses among a plurality of requesters where communications between requesters cannot be accomplished in one machine cycle.

According to the invention, each requestor is assigned a default data path which it must attempt to reserve before attempting to reserve any other data bus. If the default data bus is not available, then the requester must wait for both a data bus to become available and for a token to be passed to it. The token signals that the requester has priority to reserve the available data bus. The token rotates among the requesters with each machine cycle.

In a preferred embodiment, two requesters are each assigned a default data bus according to which of the requesters is in a "master" mode and which is in a "slave" mode. The requester in the master mode is assigned a first data bus by default, while the requester in the slave mode is assigned a second data bus by default. Each requester requests reservation of the data bus from its own priority control logic and the priority control logic of the other requester. The priority control logic allows each requester to freely reserve its default data bus as long as both data buses are available. If only one data bus is available, then the requester must wait until a token is passed to it, signaling the requester that it has priority to reserve the available data bus. The token is passed between the two requesters on each machine cycle. The token is controlled by the requester in the "master" mode so as to maintain synchronization between the requesters.

Additionally, the invention provides a simple error checking facility. The priority control logic of the requesters communicate reservations among one another. Reservations received by one requestor's priority control logic are acknowledged with a confirmation signal. The error checking facility uses simple compare logic to correlate a data bus reservation by the one requestor with a confirmation from another requester, taking into account the delay between the requesters.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
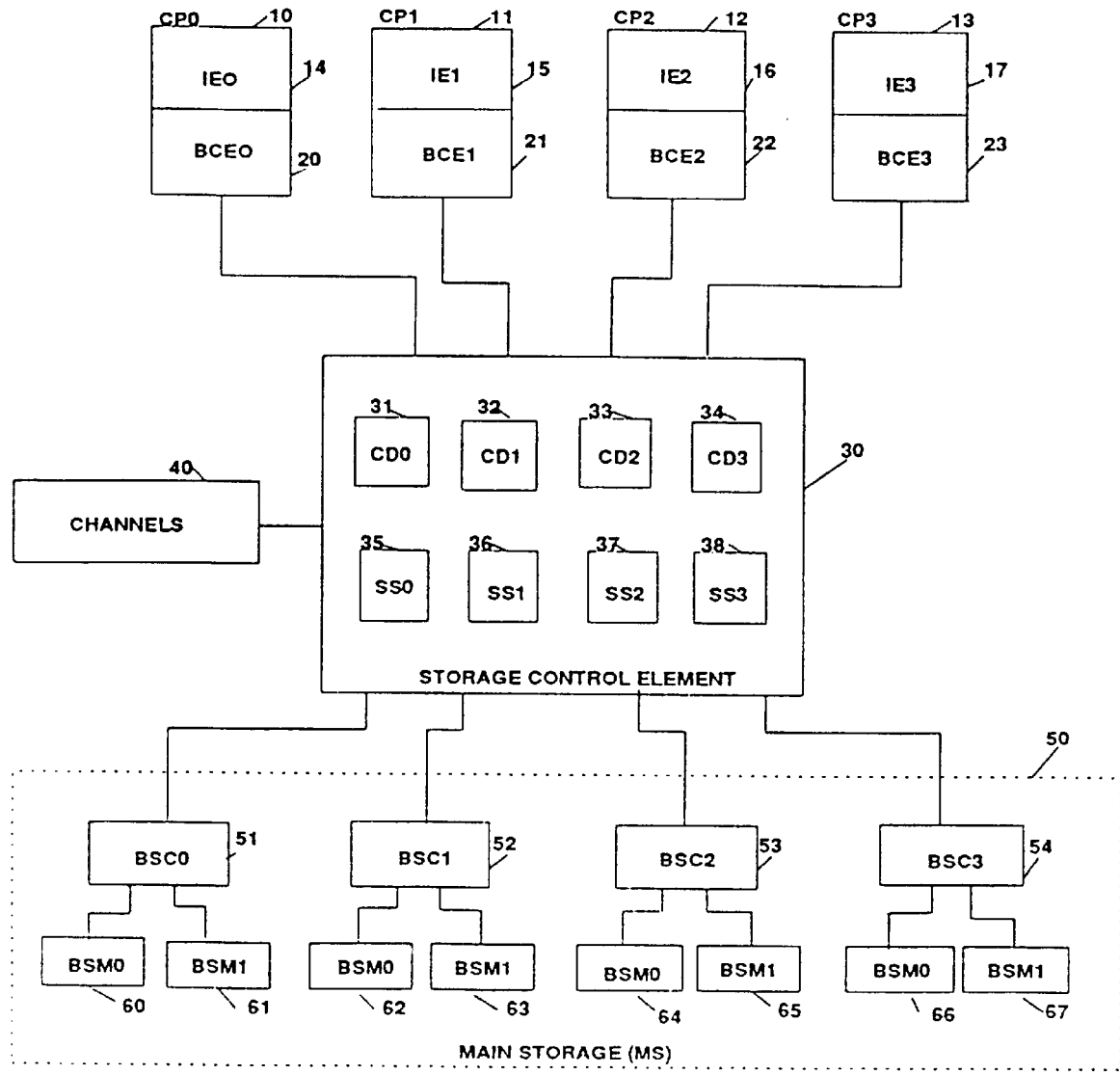
FIG. 1 is a block diagram of a multi-processing system in which the present invention may be used.

Referring now to the drawings, and more particularly to FIG. 1, there is illustrated in block diagram form a multi-processor (MP) system of the type in which the invention may be used. The MP system comprises four central processors ($CP_0$, $CP_1$, $CP_2$, and $CP_3$) 10, 11, 12, and 13 in which each CP includes an instruction execution (IE) unit 14, 15, 16, and 17 and buffer control unit (BCE) 20, 21, 22, and 23, respectively. Each IE unit includes hardware and microcode that issue instructions that require the fetching and storing of operands in main storage (MS) 50.

The IE units 14 to 17 begin a fetching or storing operation by issuing a fetch or store command to their respective cache controls BCEs 20 to 23, which include a processor store-in cache (SIC) with its associated processor cache directory (PD) and all processor cache controls which are exclusively used by their associated CPs 10 to 13. The CP generally issues a fetch or store command for each doubleword (DW) unit required by an operand. If the cache line containing the DW is in the PD, which is a cache hit, the DW is fetched or stored in the cache in accordance with the command. For an operand fetch hit in cache, the storage access is completed without any need to go outside of the BCE. Occasionally, the required DW is not in the cache, which results in a cache miss. Before the IE fetch or store command can be completed, the DW must be fetched from the main storage. To do this, the BCE generates a corresponding fetch or store miss command which requests the storage control element (SCE) 30 to obtain from main storage 50 a line unit of data having the DW required by the IE unit. The line unit will be located in the main storage 50 on a line boundary, but the required DW will be the first DW in the fetched line to be returned to the requesting BCE in order to keep the IE request going before the completion of the missed line transfer.

SCE 30 connects to the CPs 10 to 13 and main storage 50. Main storage 50 is comprised of a plurality of basic storage module (BSM) controllers $BSC_0$, $BSC_1$, $BSC_2$, and $BSC_3$ (51, 52, 53, and 54, respectively) in which each basic storage controller connects to two BSMs 0 (60, 62, 64, and 66) and 1 (61, 63, 65, and 67). The four BSCs 51 to 54 are each connected to the SCE 30.

In prior systems, the SCE 30 contains four copy directories (CDs) 31, 32, 33, and 34, each containing an image of the contents of a corresponding processor cache directory (PD) in one of the BCEs in a manner similar to that described in U.S. Pat. No. 4,394,731 to Flusche et al. A doubleword wide bidirectional data bus is provided between each BSM 60 to 67 in main storage and corresponding SCE port, and from SCE ports to I/O channel processor 40 and each of the corresponding CPs 10 to 13. Along with the data buses, there are also separate sets of command buses for control and address signals. When a CP encounters a cache miss for a DW access request, its BCE initiates a line access request to main storage by sending a miss command to SCE 30, which then reissues the command to a required BSM in main storage. In the event of a BSM busy condition, SCE 30 will save the request in a command queue and will reissue it at a later time when the required BSM 60 to 67 becomes available. SCE 30 also sequences the main storage commands in an orderly fashion so that all commands to a particular BSM are issued in first-in, first-out (FIFO) order, except when a cache conflict is found by its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20 to 23 to be received by SCE 30.

SCE 30 maintains a plurality of store stacks ($SS_0$, $SS_1$, $SS_2$, and $SS_3$) 35, 36, 37, and 38, each for holding of main storage store requests of up to 16 DWs for a corresponding CP. SCE 30 keeps enough directory information for the store stacks for the indication of main storage addresses and validity. When a store stack risks overflow, SCE 30 sends a priority request to the associated BCE 20 to 23 to hold the sending of more store requests until the BCE receives a later signal from SCE 30 clearing the store stack full condition. Data in the store stacks are updated to main storage with appropriate scheduling maintaining the incoming order within each store stack. A line fetch request from a CP is held by SCE 30 until the SCE makes sure that all existing stores to the line in the store stacks have been sent to the associated BSM 60 to 67.

As will become clear from the following description, the subject invention is concerned with those multi-processor systems which require more than one SCE. In such systems, it is necessary for the SCEs to communicate with one another to perform the functions just described. In some very large, high performance systems, physical packaging restrictions prevent SCEs from communicating with one another in the same machine cycle. The delay in communication is caused by cable length and necessitates a priority scheme for reserving data buses.

Figure 2:
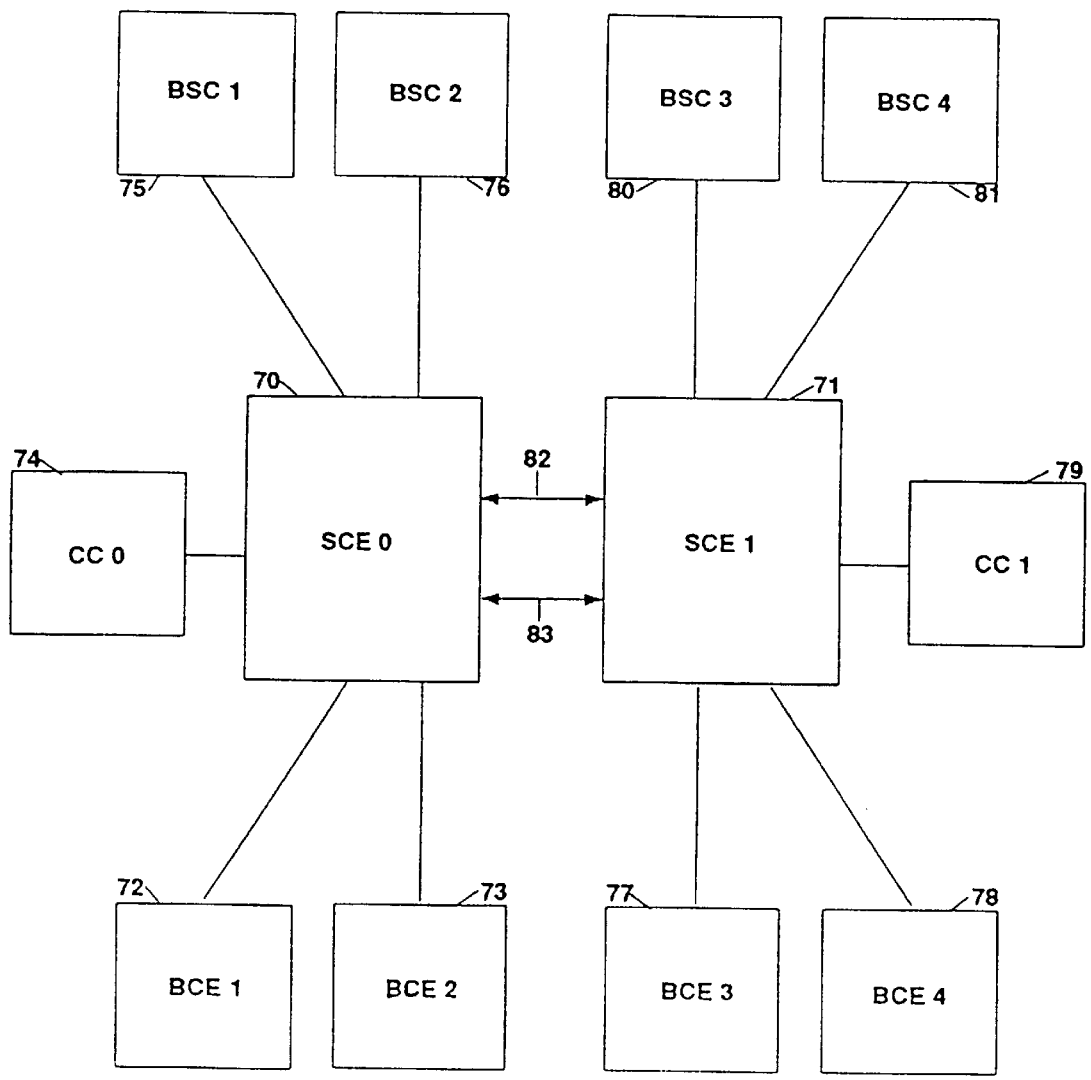
FIG. 2 is a block diagram showing a four-way multi-processor system.

FIG. 2 shows a multi-processor (MP) system which employs two SCEs 70 and 71, designated as SCE0 and SCE1, respectively. SCE 70 communicates with buffer control elements (BCEs) 72 and 73, a communication channel (CC) 74, and basic storage module controls (BSCs) 75 and 76, and SCE 71 communicates with BCEs 77 and 78, CC 79, and BSCs 80 and 81. The SCEs 70 and 71 are interconnected by two bidirectional buses 82 and 83, allowing each of the SCEs to be effectively in communication with all the BCEs, BSCs and CCs.

In previous machines, a signal sent from SCE 70 can be received by SCE 71 in the same machine cycle. Data bus reservation between the two SCEs is accomplished by priority logic which decodes the bidirectional bus reservation requests made from both sides on a cycle by cycle basis.

In a machine in which the invention has been implemented, SCE 70 and SCE 71 cannot communicate with one another in the same machine cycle. This is due to the physical packaging restrictions of the system. The cables between the two SCEs are three meters. Thus, any signal between the SCEs spends a minimum of one machine cycle in the cables.

Figure 3:
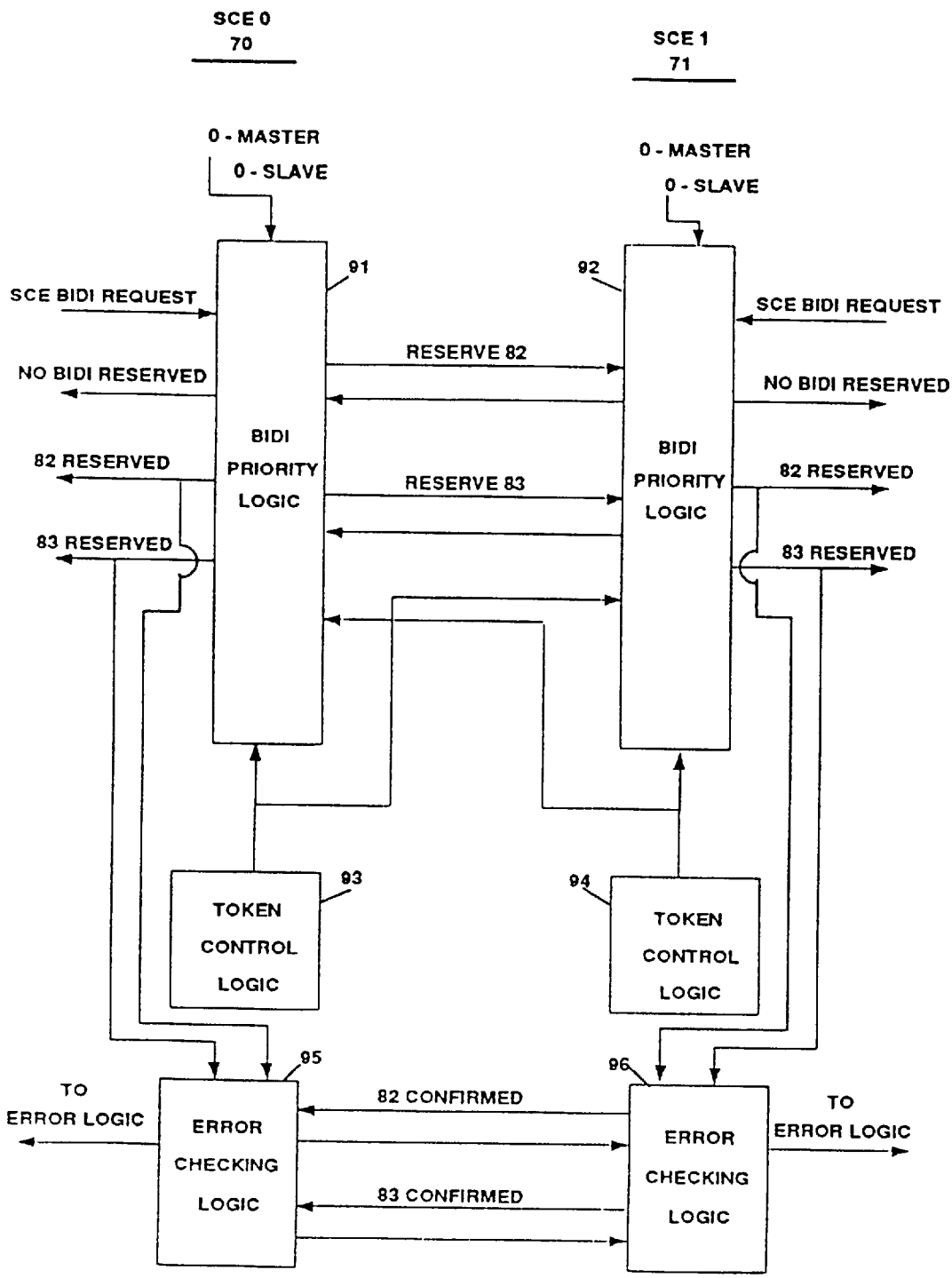
FIG. 3 a block diagram of the bidirectional bus reservation priority controls according to the invention.
Figure 4:
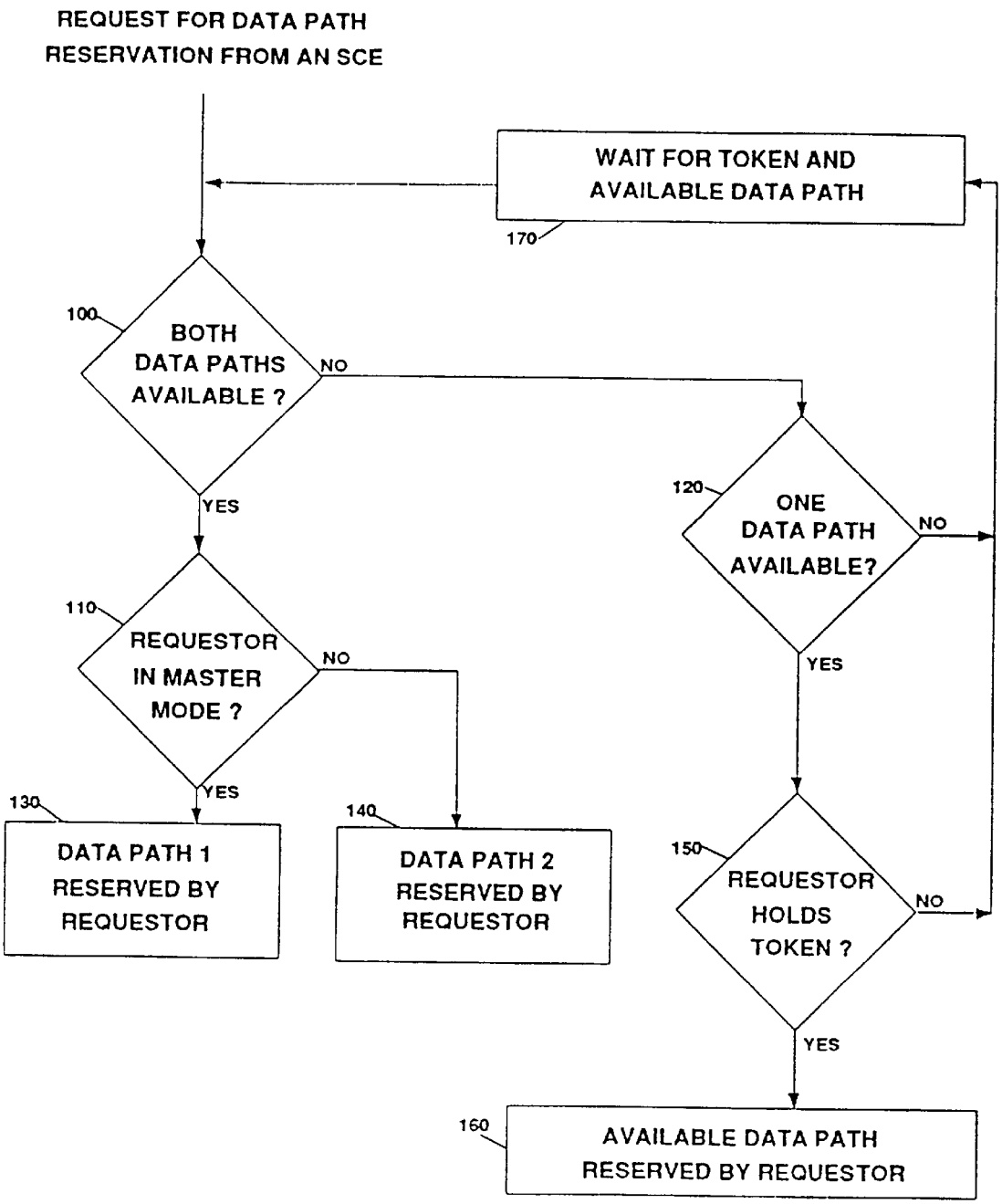
FIG. 4 is a flow diagram of the priority control logic for the bidirectional bus reservation system corresponding to FIG. 3.

FIG. 3 shows a block diagram of the BIDI reservation controls according to the invention and FIG. 4 shows a flow diagram corresponding to FIG. 3. In this example, there are two BIDI data buses 82 and 83 that interconnect SCE 70 and SCE 71. Either one of the SCEs may be designated as a "master" and the other as a "slave". For purposes of this illustration, the master SCE is SCE 70, denoted SCE0, while the slave SCE is SCE71, denoted SCE1; however, it will be understood that this relationship may be reversed or can change.

Each of the SCEs is provided with bidirectional (BIDI) bus priority logic. In FIG. 3, SCE0 BIDI priority logic 91 receives requests from SCE 70 to reserve a BIDI bus and reports the status of the buses 82 and 83. Likewise, SCE1 BIDI priority logic 92 receives requests from SCE 71 to reserve a BIDI bus and reports the status of the buses 82 and 83. In addition, the two SCEs communicate with one another and, specifically, BIDI priority logic 91 reports and receives status of buses 82 and 83 to BIDI priority logic 92 and vice versa.

Associated with the BIDI priority logic 91 is a token control logic 93, and a corresponding token control logic 94 is associated with the BIDI priority logic 92. The token control logic 93 communicates with both BIDI priority logic 91 and 92, as does the token control logic 94. Although both priority logic 91 and priority logic 92 have associated token control logic, only the token control logic of the priority logic in the master mode operates, thereby assuring synchronism between the SCEs. Also associated with the BIDI priority logic 91 is an error checking logic 95, and a corresponding error checking logic 96 is associated with BIDI priority logic 92.

The SCE in master mode tries to reserve BIDI bus 82 first and BIDI bus 83 second. Conversely, the SCE in slave mode tries to reserve BIDI bus 83 first and BIDI bus 82 second. This is done to reduce potential conflicts between SCEs in reserving BIDI buses. In the case of the example assumed, SCE0 71 is the master and therefore attempts to reserve BIDI bus 82 before trying to reserve BIDI bus 83, and SCE1 72 attempts to reserve BIDI bus 83 before trying to reserve BIDI bus 82.

An SCE can only request that one BIDI bus be reserved in a given machine cycle. If both BIDI buses 82 and 83 (blocks 130 140 and of FIG. 4) are available (block 100), the SCE is allowed to request that its default BIDI bus be reserved at any time (block 110). If only one of the BIDI buses is available (block 120), the SCE must wait for a token before it can reserve a BIDI bus, whether that bus be its default bus or the alternate bus (blocks 150, 160 and 170). The token toggles between SCEs 70 and 71 every machine cycle and is controlled by the token control logic 93 or 94 of the SCE in the master mode. For the simple case of two SCEs shown in FIG. 3, the token logic is a simple flip-flop which toggles each machine cycle. For three or four SCEs, the token control logic may be a two-stage counter, for example. Alternatively, the token control logic may take the form of a ring counter.

If an SCE is sending and receiving a BIDI bus reservation request in the same cycle, it will honor the request being received. That is, priority is given by the BIDI priority logic 91 or 92 to received request. Since the cabling between the two SCEs effectively "stores" or delays a request for a machine cycle, a request that is received by an SCE was actually transmitted by the other SCE in the previous cycle and therefore is first in time sequence.

To ensure that the BIDI priority control logic 91 and 92 is working properly on both SCEs, the error checking logic 95 and 96 checks the status of the BIDI buses as transmitted by the BIDI priority control logic. The error checking logic 95 and 96 is implemented with simple compare logic. Whenever a BIDI bus reservation request is accepted from the other SCE, a bus reserved confirm signal is sent back to the requesting SCE. The reservation and the confirmation are compared, taking into account the delay between the SCEs. This is done to ensure that the priority logic on both sides of the system are making the same decisions. If an error is detected by the error checking logic 95 and/or 96, an error signal is sent to the error logic of the corresponding SCE.

While the invention has been described in terms of a single preferred embodiment, those skilled in the art will recognize that the invention can be practiced with modification within the spirit and scope of the appended claims. For example, the preferred embodiment contemplates but two SCEs and two bidirectional data buses interconnecting them, but it will be understood that the teachings of the invention can be extended to more than two SCEs and more than two bidirectional buses.

Having thus described our invention, what we claim as new and desire to secure by Letters Patent is as follows:

1. A method of reserving a bus for data transfer in a multi-processor data processing system containing a plurality of data buses interconnecting a plurality of storage control elements, said method comprising the steps of:

assigning each of said storage control elements a default data bus;

passing a token from one storage control element to another upon an occurrence of a machine cycle;

detecting a request for data transfer from one of said storage control elements, said one of said storage control elements being a requesting source;

reserving said requesting source's default data bus for said requested data transfer when all of said plurality of data buses are available;

delaying said data transfer if all of said plurality of data buses are not available until said token is passed to said requesting source and at least one of said data buses is available such that a conflict between data busses is avoided; and upon receipt of said token by the requesting source, attempting to first reserve the requesting source's default data bus, but if the default data bus is not available, then attempting to reserve an alternate data bus, wherein data to be transferred from one storage control element to a second storage control element of said plurality of storage control elements spends at least one machine cycle in a data bus being used for the data transfer, wherein said plurality of storage control elements include first and second storage control elements and said plurality of data buses includes first and second data buses, said method further comprising the steps of:

designating said first storage control element as a master and said second storage control element as a slave, said first data bus being assigned as the default data bus for said first storage control element and said second data bus being assigned as the default data bus for said second storage control element, wherein said first storage control element includes first token control logic and said second storage control element includes second token control logic, said method further comprising the step of activating said first token control logic and deactivating said second token control logic after said first storage control element is designated said master and said second storage control element is designated said slave.

2. Apparatus for reserving a bus for data transfer in a multi-processor data processing system containing a plurality of data buses interconnecting a plurality of storage control elements, wherein each of said storage control elements is assigned a default data bus, said apparatus comprising:

token control logic means for passing a token from one storage control element to another upon an occurrence of a machine cycle; and priority logic means for detecting a request for data transfer from one of said storage control elements, said one of said storage control elements being a requesting source, said priority logic means reserving said requesting source's default data bus for said requested data transfer when all of said plurality of data buses are available but delaying said data transfer if all of said plurality of data buses are not available until said token is passed to said requesting source and at least one of said data buses is available, said priority logic means further for avoiding a conflict between data buses, wherein data to be transferred from one storage control element to a second storage control element of said plurality of storage control elements spends at least one machine cycle in a data bus being used for the data transfer, and wherein said priority logic means upon receipt of said token by the requesting source, attempts to first reserve the requesting source's default data bus, but if the default data bus is not available, said priority control logic means then attempts to reserve an alternate data bus, wherein said plurality of storage control elements include first and second storage control elements and said plurality of data buses include first and second data buses, said first storage control element being designated as a master and said second storage control element being designated as a slave, said first data bus being assigned as the default data bus for said first storage control element and said second data bus being assigned as the default data bus for said second storage control element, wherein said first storage control element includes first token control logic and said second storage control element includes second token control logic, said first token control logic being activated and said second token control logic being deactivated after said first storage control element is designated said master and said second storage control element is designated said slave.

3. A method of reserving a bus for data transfer in a multi-processor data processing system containing a plurality of data buses interconnecting a plurality of storage control elements, said method comprising the steps of:

assigning each of said storage control elements a default data bus;

passing a token from one storage control element to another upon an occurrence of a machine cycle;

detecting a request for data transfer from one of said storage control elements, said one of said storage control elements being a requesting source;

reserving said requesting source's default data bus for said requested data transfer when all of said plurality of data buses are available; and delaying said data transfer if all of said plurality of data buses are not available until said token is passed to said requesting source and at least one of said data buses is available such that a conflict between data busses is avoided, wherein said plurality of storage control elements include first and second storage control elements and said plurality of data buses includes first and second data buses, said method further comprising the steps of:

designating said first storage control element as a master and said second storage control element as a slave, said first data bus being assigned as the default data bus for said first storage control element and said second data bus being assigned as the default data bus for said second storage control element;

upon receipt of said token by the requesting source, attempting to first reserve the requesting source's default data bus, but if the default data bus is not available, then attempting to reserve an alternate data bus;

reporting a status of said data buses to said requesting source; and checking said status for errors, wherein data to be transferred from one storage control element to a second storage control element of said plurality of storage control elements spends at least one machine cycle in a data bus being used for the data transfer, wherein said first storage control element includes first token control logic and said second storage control element includes second token control logic, said method further comprising the step of activating said first token control logic and deactivating said second token control logic after said first storage control element is designated said master and said second storage control element is designated said slave.

* * * * *